Patented May 30, 1939

2,160,576

UNITED STATES PATENT OFFICE 2,160,576

PREPARATION OF ANHYDROUS BORON FLUORIDE

Donald J. Loder, Wilmington, Del., assignor to E. I. du Pont de Nemours & Company, Wilmington, Del., a corporation of Delaware No Drawing. Application October 10, 1936, Serial No. 105,154

17 Claims. (Cl. 260—541)

This invention relates to a process for the preparation of boron fluoride and more particularly to its preparation from water complexes containing it.

An object of the present invention is to provide a process for the preparation of anhydrous boron fluoride. Another object of the invention is to provide a process wherein boron fluoride can be separated from a mixture or compound containing it and water. A more specific object of the invention is to provide a process wherein a mixture or compound consisting of boron trifluoride and water is distilled alternately at high and low pressures whereby substantially anhydrous boron fluoride is recovered. Other objects and advantages of the invention will hereinafter appear.

I have found that mixtures or compounds containing water and a boron-fluoride constituent can be so treated that a substantially anhydrous boron fluoride may be recovered providing the mixtures or compounds give constant boiling mixtures which change with pressure. In other words, under given pressure conditions water or the boron fluoride may be driven off by heat until a composition is attained corresponding to a constant boiling mixture. The pressure is changed, the mixture again heated to drive off one or the other of the constituents until a second constant boiling mixture remains. By repeating the separation under the original conditions further separation of the constituents occurs. By thus alternating between the pressures or between pressure and vacuum substantially complete separation of the boron fluoride constituent from the mixture is possible.

The process may be conducted by subjecting to distillation the mixture or compound under a certain predetermined pressure and subsequently when a constant boiling mixture is obtained, after evolution of a portion of one of the constituents which vaporizes below the boiling point of the constant boiling mixture, the pressure is either increased or decreased and the distillation continued under the new pressure until another constant boiling mixture remains. The latter constant boiling mixture, which may differ in molal composition from the first, is attained after the evolution of a portion of one of the constituents.

I shall now illustrate by way of examples methods of conducting my invention but it will be understood that I am not limited in any way by the details therein given:

Example I

The process is especially well adapted, for example, to the preparation of substantially anhydrous boron fluoride from its mixtures or compounds with water. When preparing boron fluoride the distillation may be carried out upon the product obtained by the interaction of 1 mole of orthoboric acid and 3 moles of hydrofluoric acid which is a water-boron fluoride mixture or compound containing in the order of three moles of water per mole of boron fluoride. Distillation is initiated at subatmospheric pressure, say in the neighborhood of 30 millimeters and generally below 100 millimeters mercury pressure and continued under this pressure until approximately 23% of the water contained in the mixture distills over leaving a constant boiling mixture having a composition of approximately 2.3 moles of water per mole of boron fluoride. The pressure is then increased to substantially atmospheric pressure, distillation is continued and under this pressure boron fluoride is driven over until the ratio of water to boron fluoride has reached substantially 2.5. By again subjecting this residue to vacuum distillation another portion of the water can be distilled off and by subsequent pressure and vacuum distillations the boron fluoride can be substantially completely separated from the water. Had the pressure differential been larger, the recovery of boron fluoride per pass would also have been larger.

Example II

An 859 gram sample of a mixture of the composition 2CH₃COOH:1.5HOH:1BF₃ was charged into a copper still pot under a 4 ft. packed column. Free acetic acid and water were first stripped at 30 mm. pressure. When all of the free acid and water had distilled, the still pot residue was heated at 1 atmosphere until no more boron fluoride was evolved. This pressure vacuum cycle was repeated several times on the material, boron fluoride being removed in the 1 atmosphere distillation and acetic acid and water under reduced pressure. The results are summarized in the table.

| Run | Mix | Cycle (cycle between 30 mm. and 760 mm.) | Mole percent $BF_3$ removed | Mole percent HAc removed | Percent acid in water | Molal ratio $HAc/H_2O/BF_3$ | | |
|---|---|---|---|---|---|---|---|---|
| | | | | | | Acid | $H_2O$ | $BF_3$ |
| 1 | $2HAc, (H_2O)_{1.8}BF_3$ | 1 | 8.5 | 64.7 | 93.9 | 0.71 | 1.22 | 1 |
| | | 2 | 7.83 | 7.83 | 97.8 | .60 | 1.32 | 1 |
| | | 3 | 5.9 | 7.62 | 97.6 | .47 | 1.42 | 1 |
| | | 4 | 5.9 | 6.67 | 98.4 | .34 | 1.52 | 1 |
| | | 5 | | 4.90 | 98.4 | .23 | 1.63 | 1 |

Not only can boron fluoride be separated from admixture with water or from a compound containing it and water in accord with my process, but likewise compounds containing boron fluoride, but more particularly the simple halides of boron, not decomposable under the conditions of the reaction. My process is applicable to the separation of a boron fluoride in substantially anhydrous form from liquids containing very high proportions of water to the halide, e. g. 100 moles of water per 1 mole of the halide as well as from those in which the ratio on a molal basis may be as low as 0.05 mole of water per mole of the halide.

It is not material to my invention that the distillation be initiated under subatmospheric pressure followed by distillation under atmospheric pressure or superatmospheric pressure for in some instances it may be more desirable to initiate the distillation at atmospheric pressure followed by subatmospheric pressure or even to initiate the reaction at atmospheric pressure followed by superatmospheric pressure. The principal consideration underlying the selection of the two pressure stages is that at each of the pressure stages one of the constituents is driven off leaving a constant boiling mixture. By selecting, therefore, different pressure or vacuum conditions, for the particular complex treated, it is possible to separate the boron halide from mixtures or compounds which have constant boiling mixtures of dissimilar compositions at different pressures.

The removal of water may be facilitated by having an aliphatic organic acid present and particularly such acids as acetic, propionic, butyric and isobutyric acids are very affective for this purpose. The amount of acid used may vary considerably altho I have found that from 0.1 to 0.5 mole of the acid (preferably about 0.2 mole of acetic acid) per mole of boron fluoride gives satisfactory results altho considerably higher amounts may be employed as shown by Example II.

From a consideration of the above specification it will be appreciated that many changes may be made in the details therein given without departing from the invention or sacrificing any of its important advantages.

I claim:

1. A process of preparing substantially anhydrous boron fluoride, which comprises reacting orthoboric acid with hydrofluoric acid and separating boron fluoride from the resulting product by distillation of the resulting complex under at least two different pressure stages.

2. A process of preparing substantially anhydrous boron fluoride from water and boron fluoride which comprises distilling the boron fluoride and water under at least two different pressure stages.

3. A process of preparing substantially anhydrous boron fluoride from water and boron fluoride which comprises heating the boron fluoride and water in the presence of an aliphatic organic acid under at least two different pressure stages, the boron fluoride being driven over in one stage and the water being driven over in the other stage.

4. A process of preparing substantially anhydrous boron fluoride from water and boron fluoride which comprises heating the boron fluoride and water in the presence of acetic acid under at least two different pressure stages, the boron fluoride being driven over in one stage and the water being driven over in the other stage.

5. A process for the preparation of substantially anhydrous boron fluoride which comprises distilling a liquid containing boron fluoride and water under two different pressure stages, conducting one stage under subatmospheric pressure during which water distills off and conducting the second stage under pressures higher than the first under which the boron fluoride distills off in substantially an anhydrous form.

6. A process for the preparation of substantially anhydrous boron fluoride which comprises distilling a liquid containing boron fluoride and water under two different pressure stages, conducting one stage under subatmospheric pressure during which water distills off and conducting the second stage under at least atmospheric pressures under which the boron fluoride distills off in substantially an anhydrous form.

7. In a process of separating boron trifluoride from its complex with water the steps which comprise effecting the separation by heating to remove a portion of the water by distillation under one pressure and further heating under another pressure to remove a portion of the boron trifluoride.

8. A process of preparing substantially anhydrous boron trifluoride from its complex with water which comprises separating the water by distillation at one pressure and separating a portion of the boron trifluoride by distillation at another pressure.

9. The process in accord with claim 8, conducted in the presence of an organic acid.

10. The process in accord with claim 8 conducted in the presence of acetic acid.

11. In a process of separating boron trifluoride from its complex with water the steps which comprise distilling a liquid containing from 0.05 to 100 mols of water per mol of boron fluoride under a pressure less than atmospheric to remove a portion of the water and subsequently heating the residue at a higher pressure than the first until a portion of the boron trifluoride has been removed.

12. A process of preparing substantially anhydrous boron trifluoride which comprises distilling a liquid containing a complex of boron trifluoride and water at a pressure of from 30 to 100 mm., thereby driving off water until the residue has a substantially constant boiling point under the pressure used and then, at pressures in excess of that first employed, heating the residue to distill over substantially anhydrous boron trifluoride, and alternately continuing the distillation steps under substantially the same pressures until approximately all of the boron trifluoride has been recovered.

13. In a process of separating boron trifluoride from its complex with water the steps which comprise subjecting the complex to distillation under pressures lower than atmospheric to separate a portion of the water and leave as a residue a constant boiling mixture having a higher proportion of boron trifluoride than the original complex treated, subsequently heating the resulting residue at a pressure materially above the first pressure used to separate a portion of the boron trifluoride and leave a residue having a higher concentration of water than that present in the residue first obtained.

14. In a process of separating boron trifluoride from its complex with water in which the ratio of water to boron trifluoride is at least 2 to 1, the steps which comprise distilling the complex at a pressure lower than atmospheric to separate a portion of the water and to leave a constant boiling residue having a higher proportion of boron trifluoride than water, heating the residue thus obtained at a pressure materially greater than the first mentioned pressure to separate a portion of the boron trifluoride and leaving a second residue having a higher proportion of water to boron trifluoride than was present in the first residue.

15. A process for the separation of substantially anhydrous boron trifluoride from a liquid containing water and a complex of boron trifluoride and water, which comprises distilling the liquid below 100 mm. mercury pressure, until approximately 23% of the water contained in the mixture distills over leaving a constant boiling residue containing approximately 2.3 mols of water per mol of boron trifluoride and heating the residue thus obtained at substantially atmospheric pressure until sufficient boron trifluoride distills over to leave a water to boron trifluoride ratio of substantially 2.5 to 1.

16. The process of claim 15 wherein the distillation is repeated alternately, first under sub-atmopspheric pressure and then under substantially atmospheric pressure until substantially complete separation of the boron trifluoride from the water has been effected.

17. In a process of separating boron trifluoride, from its liquid complex with water, the steps which comprise distilling the liquid at any certain pressure to separate a portion of one of the constituents and leave a residue having a higher proportion of the other constituent than is present in the original liquid, distilling the residue at a pressure materially different from the first mentioned pressure to separate a portion of the second constituent and leave a residue having a higher concentration of the first constituent than that present in the residue first attained.

DONALD J. LODER.